Jan. 27, 1970   A. UNDERWOOD   3,491,807
ICE CUTTING MACHINE
Filed Aug. 15, 1967   2 Sheets-Sheet 2
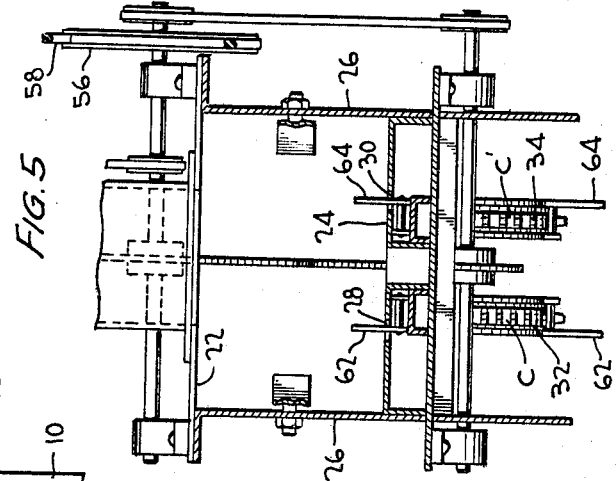
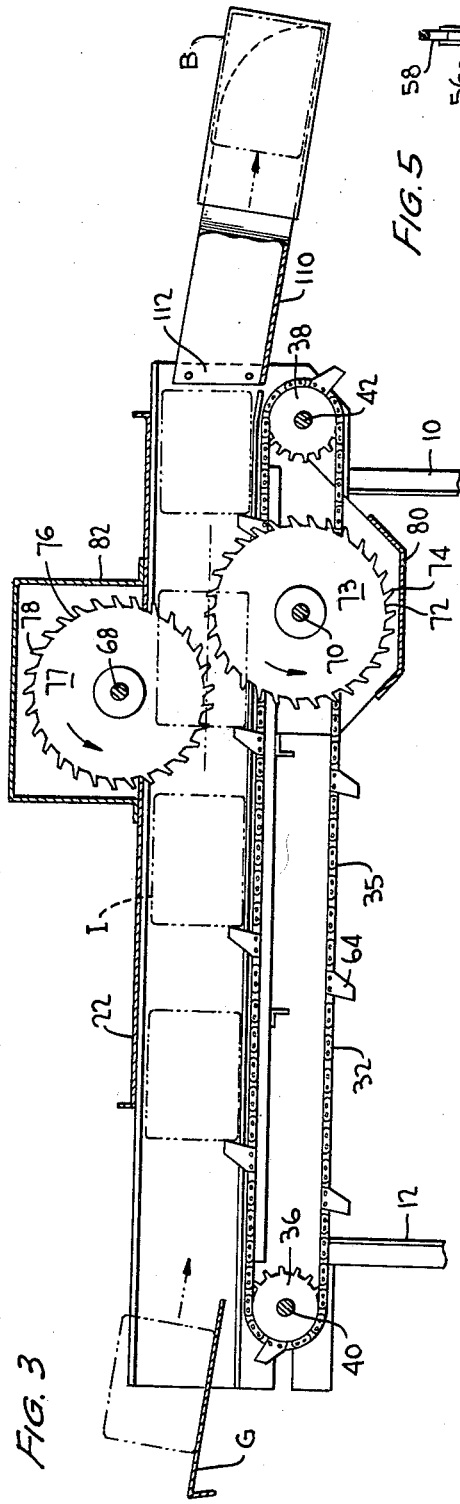
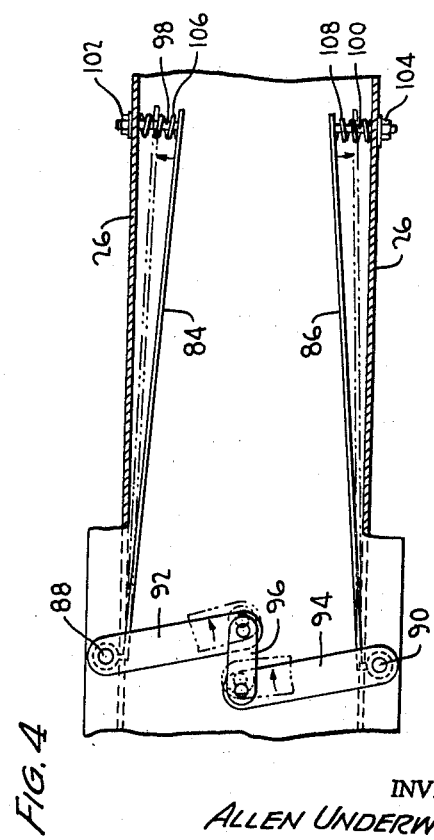
INVENTOR,
ALLEN UNDERWOOD
BY Jacobi & Davidson
ATTORNEYS

United States Patent Office 3,491,807
Patented Jan. 27, 1970

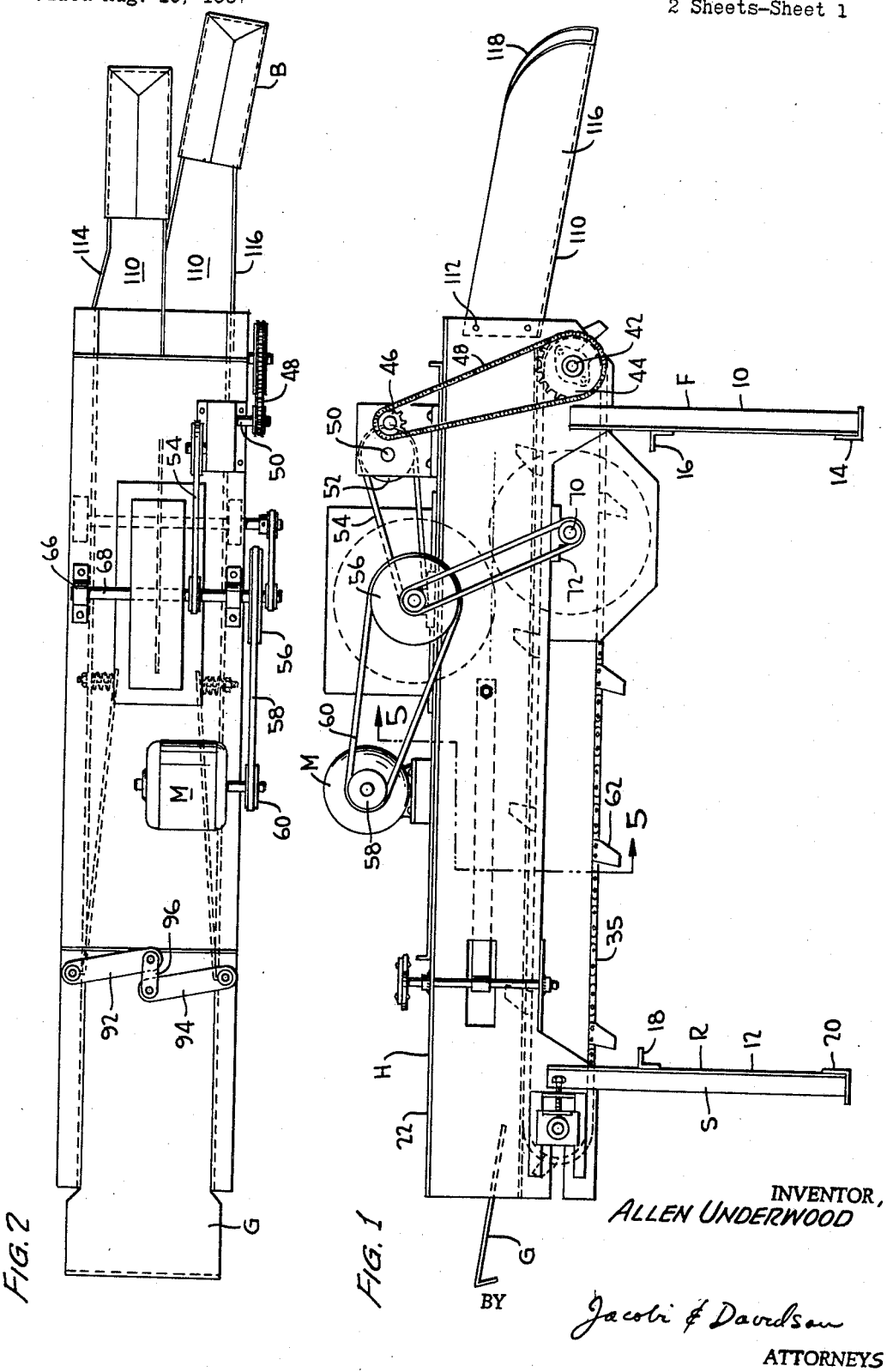

3,491,807
ICE CUTTING MACHINE
Allen Underwood, 612 Indiana Ave.,
La Porte, Ind. 46350
Filed Aug. 15, 1967, Ser. No. 660,710
Int. Cl. B26d 1/12; E21c 25/16
U.S. Cl. 143—40
11 Claims

ABSTRACT OF THE DISCLOSURE

A cutting machine for dividing articles, such as blocks of water ice or Dry Ice, into equal parts upon the articles being advanced past a pair of superimposed saw discs that rotate in adjacent spaced vertical planes and lie substantially midway between the side walls of a housing through which the articles are advanced by means of endless chains that have spaced projections which extend through slots in the bottom wall of the housing; the endless chains and saw discs are driven by a common electric motor; a pair of spring biased guide members within the housing enable articles of varying size to be positioned midway between the side walls of the housing as they are advanced past the saw discs; the outlet of the housing is provided with a pair of downwardly and divergently directed chutes on which bags or the like may be placed for receiving, respectively, the halves of the divided articles.

BACKGROUND OF THE INVENTION

The invention relates generally to article cutting machines and particularly to machines for dividing blocks of water ice or Dry Ice into equal parts.

It is generally known that when ice is formed in freezing trays the liquid which is to be solidified therein is filled into the trays to a predetermined level. Since each time the trays are filled, they are filled to exactly the same level, the blocks of ice which are produced therein always have exactly the same weight, for example, twenty-five pounds. Because it is usually desirable to package and sell such blocks of ice in half this quantity, it is necessary that the blocks of ice formed in the freezing trays be divided into equal halves. Prior to the present invention, the blocks of ice formed in the trays were either manually divided or divided by cutting machines that were found to be unsatisfactory since they could not be depended upon to provide divided blocks having equal predetermined weights. The sale of blocks of ice containing less than the required weight, due to the inability of existing apparatus, in every instance, to equally divide the blocks of ice as formed in the freezing trays, has led to serious problems with governmental agencies having the responsibility of making sure that the public receives the quantity of merchandise it pays for.

A further problem often encountered in the delivery of blocks of ice from existing dispensing devices results from the fact that the blocks are delivered unwrapped. Such unwrapped blocks of ice are not only difficult to handle because of their low temperature, but they lose considerable weight in hot weather and cause substantial damage to property as a result of their melting.

Taking into consideration the foregoing defiicencies, it is the primary object of the present invention to provide a cutting machine for dividing articles such as blocks of water ice or Dry Ice into smaller blocks. In carrying out this object of the invention, it is especially desirable that the machine for cutting large blocks of ice into smaller blocks be constructed so that the resulting smaller blocks are of equal size. In order to accomplish this result, it has been found necessary that the cutting mechanism employed therein lie substantially in a single vertical plane and that guide means be provided to position the larger block of ice, as it is advanced past the cutting mechanism, so that a vertical plane passing through the middle of the block of ice coincides with the vertical plane of the cutting mechanism.

Accordingly, it is another object of the invention to provide an ice cutting machine having cutting mechanism that lies substantially in a single vertical plane and yet does not result in an increase in the overall size of the ice cutting machine, but to the contrary, effects a redutcion in the size of the machine in at least one of its dimensions. In order to bring about this reduction in size of the ice cutting machine, the cutting mechanism thereof has been designed with a pair of superimposed laterally offset closely adjacent cutting blades or discs having saw teeth on each of their peripheries.

Still another object of the invention is to provide a novel mechanism for guiding the articles to be divided with respect to the vertical plane for the article cutting disc or blades. Specifically, such object concerns a guide mechanism which includes guide members located on opposite sides of the cutting mechanism. These guide members are yieldingly biased toward said cutting mechanism so that an article, such as a block of ice, in advancing to such cutting mechanism is automatically adjusted in a manner that a vertical plane passing through its middle will always lie in the vertical plane of the article cutting mechanism, notwithstanding variations in the width of the articles produced by different freezing trays and fed to the article cutting machine. Thus, regardless of variations in the width of the blocks formed in the freezing trays, due to variations which may occur in the width of the freezing trays employed, the width of the divided parts of any block will be equal.

A further object of the invention is to provide a novel construction for delivering the parts of an article which has been divided into a chute structure that supports individual containers for receiving such divided parts.

A still further object is the provision of a water or Dry Ice cutting machine according to the teachings of the present invention which is simple in construction, durable and formed of material of relatively low cost.

The invention will be better understood and objects other than those set forth will become apparent after reading the following description thereof.

Such description refers to the annexed drawings presenting preferred and illustrative embodiments of the invention.

In the drawings:

FIGURE 1 is a side view of an article cutting machine in accordance with the present invention;

FIGURE 2 is a plan view thereof;

FIGURE 3 is a longitudinal sectional view thereof;

FIGURE 4 is a view, partly in section, showing the article guide means; and,

FIGURE 5, is a transverse sectional view taken on the line 5—5 of FIGURE 4.

DESCRIPTION OF THE PREFERRED EMBODIMENT

Referring to the drawings, it is to be noted that the device disclosed therein includes a support structure S having a forward end F and a rearward end R. The support structure S comprises two forward legs 10 formed, preferably, from L-shaped channel members at the forward end of the structure and two rear legs 12 formed, preferably, from L-shaped channel members at the rear end of the structure R. The forward legs 10 are provided with a lower transverse brace member 14 and an upper transverse brace member 16. Similarly, the rear legs 12 are braced by an upper transverse brace member 18 and a lower transverse brace member 20. All the brace members 14, 16, 18 and 20 are, preferably, made from L-shaped channel material, for example, of iron or steel. However, it is to be understood that they may be made from flat stock of any desired composition without departing from the invention.

An elongated housing H having a top wall 22, a bottom wall 24, and side walls 26 is carried by support structure S.

Parallel slots 28 and 30 are provided within and extend longitudinally throughout the length of the bottom wall 24 of housing H. Conveyors C and C' are, respectively, located below slots 28 and 30 and include endless sprocket chains 32 and 34 formed of links 35. Each sprocket chain 32 and 34 extends around sprocket wheels 36, 38 that are, respectively, carried by shafts 40, 42 mounted for rotation on the housing H. Shaft 42 is provided with an additional sprocket wheel 44 that is driven by a sprocket wheel 46 and sprocket chain 48. Sprocket wheel 46 is indirectly driven by a shaft 50 that is rotated by a pulley 52 mounted on shaft 50. Pulley 52 is driven by a belt 54 which in turn is driven by a pulley 56 that is driven by an electric motor M through an associated pulley 58 and belt 60. Article advancing projections 62, 64 are fixed to spaced chain links 35 of sprocket chains 32, 34, respectively, and project outwardly from said chain links 35. On rotation of sprocket wheels 36 and 38, the projections 62 and 64 are advanced through the slots 28 and 30 in the bottom wall 24 of the housing H from the rear end of the housing H to the forward end of the housing. In FIGURE 3, there is shown, in broken lines, articles such as blocks of ice I being advanced through the housing H as a result of the forward movement of projections 64. It should be understood, however, that the blocks of ice I are simultaneously advanced through the housing by projections 62 as well as by projections 64. However, due to the manner in which the article cutting device is illustrated in FIGURE 3, projections 62 cannot be illustrated therein.

A shaft 66, mounted in bearings 68 is supported on the top wall 22 of housing H and extends transversely thereof. Similarly, a shaft 70 mounted on bearings 72 is supported on the bottom wall 24 of housing H and extends transversely thereof. Shaft 68 is superimposed and offset with respect to shaft 70 so that the saw disc or saw blade 72 having saw teeth 74 extends forwardly of the saw disc or saw blade 76 having saw teeth 78. Furthermore, the faces 73, 77, respectively, of the saw discs or saw blades 72, 76 lie in vertical planes located closely adjacent to each other and substantially midway between the side walls 26, 26 of housing H.

In order to guard against injury to persons that might come into contact with the saw discs 72, 76, a protective cover 80 is provided for saw disc 72 and a protective cover 82 is provided for saw disc 76.

A pair of guide members 84, 86, respectively, extend through openings 85, 87 in side walls 26, 26 and are, respectively, mounted on pivot pins 88, 90 supported adjacent side walls 26, 26. Rigidly connected to pivot pin 88 for movement therewith is a link member 92 and, likewise, rigidly connected to pivot pin 90 is a link member 94. Interconnecting link members 92 and 94 is a connector link member 96 which compels the link members 92 and 94 to move together and accordingly, compels the guide members 84 and 86 to move together, both inwardly and outwardly, with respect to the side walls 26, 26.

Secured to guide members 84 and 86 are, respectively, bolt-like members 98, 100 that extend through side walls 26, 26 and have mounted thereon nut members 102, 104.

A spring 106 yieldingly biases the guide member 84 inwardly away from one side wall, and another spring 108 similarly yieldingly biases the other guide member 86 inwardly away from the other side wall 26.

An outlet means 110 is attached at 112 to the forward end of housing H. Outlet means 110 comprises a pair of downwardly directed chute members 114, 116 which are curved on their outer ends as at 118 to facilitate receiving thereon open ended insulated bags or equivalent containers B.

An article admission chute, such as illustrated at G, may be provided at the rear end of the housing H to aid in inserting articles such as blocks of water or Dry Ice into the housing H of the article cutting machine.

In the operation of the article cutting machine embodying the present invention, an article to be divided, which may be a block of water or Dry Ice, is placed on the admission chute G. The article slides by gravity into housing H and onto the conveyors C, C'. As the sprocket chains 32 and 34 travel about sprocket wheels 36, 38, the projections 62, 64 which, respectively, extend through slots 28 and 30 move the blocks of ice I fed thereon past the saw blades 72, 76. The blocks of ice, on being carried forwardly to the saw blades 72 and 76, are guided by a pair of guide members 84, 86 which are interconnected by links 92, 94 and 96 so that they are compelled to move inwardly toward the faces 73, 77 of saw blades 76 or outwardly away therefrom together. Springs 106 and 108 associated with the guide members 84, 86 bias the guide members 84, 86 toward a position midway between the side walls 26, 26 so that regardless of variations in the width of the articles to be divided, such articles will be positioned as they are moved toward the saw blades so that a plane passing vertically midway through the articles to be divided coincides with a vertical plane passing substantially through the faces 73, 77 of the saw blades. Thus, regardless of the width of the articles to be divided, such articles will be divided into two equal widths. If the articles to be divided are blocks of water or Dry Ice. I, the cutting machine of the present invention will divide such blocks of ice into equal halves. Assuming such block of ice to be of the correct weight before being divided, the divided blocks obviously will also be of the correct weight. Since the ice cutting machine includes structure for immediately bagging or otherwise wrapping the divided blocks of ice in, if desired, insulated containers or packages, there is little likelihood of loss of weight due to melting, particularly, if the wrapped divided blocks are promptly placed in an ice house for storage or sale. Thus, among the many problems previously encountered in cutting ice that the instant invention overcomes, the problem of meeting the weight requirements of governmental authorities has also been overcome.

After reading the foregoing detailed description, it will be apparent that the objects set forth initially have been successfully achieved. Accordingly, what I claim is:

1. An ice cutting machine comprising:
   a support structure having a forward end and a rearward end;
   an elongated housing carried by said support structure having a bottom wall and side walls;
   slot means within and extending longitudinally of said bottom wall;
   conveyor means mounted adjacent said bottom wall, below said slot means;
   article advancing means carried by said conveyor means and adapted to pass through said slot means in a forward direction to move an article through said housing;
   saw disc means for severing an article into parts;
   means mounting said saw disc means on said housing for rotation in a plane lying substantially midway between said side walls to thereby effect severing of an article into parts as it is moved past said saw disc means;

means for driving said conveyor means and said saw disc means;

a pair of guide means interconnected for simultaneous adjustment relative to the plane of rotation of said saw disc means for guiding the position of an article with respect to said saw disc means during longitudinal movement of an article through said housing past said saw disc means;

spring means located between each guide means and an adjacent wall; and a nut and bolt-like means arranged to support each spring means and limit adjustment of the guide means toward the plane of rotation of said saw disc means.

2. An ice cutting machine as defined in claim 1 wherein said saw disc means comprises:

a first saw disc having a saw face;

means mounting said saw disc for rotation about a first axis located above said bottom wall and for rotation in a plane lying substantially midway between said side walls;

a second saw disc having a saw face;

means mounting said second saw disc for rotation about a second axis below said bottom wall and for rotation in a plane lying substantially midway between said side walls;

the mounting of said saw discs being such that their faces are closely spaced with respect to each other.

3. An ice cutting machine as defined in claim 2 wherein the peripheral portions of the faces of said discs overlap.

4. An ice cutting machine as defined in claim 2 wherein said saw discs have substantially equal diameters.

5. An ice cutting machine as defined in claim 4 wherein the peripheral portions of the faces of said discs overlap.

6. An ice cutting machine as defined in claim 1 wherein an outlet means cooperates with said housing for delivering the severed parts of an article from said housing independently of each other.

7. An ice cutting machine as defined in claim 1 wherein said slot means comprises a plurality of parallel slots and said conveyor means comprises a conveyor below each of said slots.

8. An ice cutting machine as defined in claim 1 wherein said elongated housing is provided with a pair of chute members for delivering the severed parts of an article from said housing independently of each other, said chute members respectively, terminating in ends adapted to support article receiving containers thereon and are downwardly directed with respect to said support structure and diverge with respect to each other.

9. An ice cutting machine comprising:

a support structure having a forward end and a rearward end;

an elongated housing carried by said support structure having a bottom wall and side walls;

slot means within and extending longitudinally of said bottom wall;

conveyor means mounted adjacent said bottom wall, below said slot means;

article advancing means carried by said conveyor means and adapted to pass through said slot means in a forward direction to move an article through said housing;

a first saw disc having a saw face;

means mounting said first saw disc for rotation about a first axis located above said bottom wall and for rotation in a plane lying substantially midway between said side walls;

a second saw disc having a saw face;

means mounting said second saw disc for rotation about a second axis below said bottom wall and for rotation in a plane lying substantially midway between said side walls;

the mounting of said saw discs being such that their faces are closely spaced with respect to each other and their peripheral portions slightly overlap;

means for driving said conveyor means and said saw discs;

said elongated housing having an outlet means that comprises a pair of chute members that, respectively, terminate in ends adapted to support article receiving containers thereon, are downwardly directed with respect to said support structure and diverge with respect to each other.

10. An ice cutting machine comprising:

a support structure having a forward end and a rearward end;

an elongated housing carried by said support structure having a bottom wall and side walls;

slot means within and extending longitudinally of said bottom wall;

conveyor means comprising an endless driven chain mounted adjacent said bottom wall below said slot means;

article advancing means comprising a plurality of spaced rigid projections extending outwardly from said endless chain adapted to pass through said slot means in a forward direction to move an article through said housing;

a first saw disc having a saw face;

means mounting said first saw disc for rotation about a first axis located above said bottom wall and for rotation in a plane lying substantially midway between said side walls;

a second saw disc having a saw face;

means mounting said second saw disc for rotation about a second axis below said bottom wall and for rotation in a plane lying substantially midway between said side walls;

the mounting of said saw discs being such that their faces are closely spaced with respect to each other and their peripheral portions slightly overlap;

means for driving said conveyor and saw discs comprising a pair of belts;

means for enclosing said saw discs;

means for positioning an article with respect to said saw discs including a pair of guide members interconnected for simultaneous adjustment towards the faces of the saw discs by spring means located between each guide member and a, respective, adjacent side wall and supported on a nut and bolt-like means; and outlet means which includes a pair of chute members, that, respectively, terminate in ends adapted to support article receiving containers thereon, are downwardly directed with respect to said support structure and diverge with respect to each other.

11. An ice cutting machine comprising:

a support structure having a forward end and a rearward end;

an elongated housing carried by said support structure having a bottom wall and side walls;

slot means within and extending longitudinally of said bottom wall;

a first saw disc having a saw face;

means mounting said first saw disc for rotation about a first axis located above said bottom wall and for rotation in a plane lying substantially midway between said side walls;

a second saw disc having a saw face;

means mounting said second saw disc for rotation about a second axis below said bottom wall and for rotation in a plane lying substantially midway between said side walls;

the mounting of said saw discs being such that their faces are closely spaced with respect to each other and their peripheral portions slightly overlap;

conveyor means comprising a pair of endless chains;

article advancing means comprising a plurality of spaced rigid projections extending outwardly from each of said endless chains;

means for driving said conveyor means and saw discs comprising a pair of belts driven by an electric motor mounted on said elongated housing;

means enclosing said saw discs;

means for positioning an article with respect to said saw blades including a pair of guide members interconnected for simultaneous adjustment towards the faces of the saw discs by spring means located between each guide member and a, respective, adjacent side wall and supported on a nut and blot-like means; and outlet means which include a pair of chute members that, respectively, terminate in ends adapted to support article receiving containers thereon, are downwardly directed with respect to said support structure and diverge with respect to each other.

References Cited

UNITED STATES PATENTS

| | | | |
|---|---|---|---|
| 518,655 | 4/1894 | Stow | 143—40 |
| 995,465 | 6/1911 | Jaegle | 83—446 X |
| 1,490,308 | 4/1924 | Bedford | 143—40 X |
| 1,504,130 | 8/1924 | Macbeth et al. | 83—425 X |
| 1,866,941 | 7/1932 | Peters | 83—102 X |
| 2,080,452 | 5/1937 | Zeigler | 143—38 X |
| 2,664,926 | 1/1954 | Fuglie | 143—40 X |
| 2,679,919 | 6/1954 | De Koning. | |

FRANK T. YOST, Primary Examiner

U.S. Cl. X.R.

83—105, 423, 425, 446, 449; 125—13; 143—49